United States Patent [19]
Redekopp

[11] Patent Number: 5,531,406
[45] Date of Patent: Jul. 2, 1996

[54] FLOW-VECTORED TRAILING-EDGE FOR AIRFOILS AND JETS

[75] Inventor: Larry G. Redekopp, Northridge, Calif.

[73] Assignee: University of Southern California, Los Angeles, Calif.

[21] Appl. No.: 243,231

[22] Filed: May 16, 1994

[51] Int. Cl.$^6$ .................................................. B64C 21/04
[52] U.S. Cl. .......................... 244/208; 244/23 D; 244/52; 244/209
[58] Field of Search ................................. 244/201, 204, 244/207, 208, 209, 52, 23 D

[56] References Cited

U.S. PATENT DOCUMENTS

| | | | |
|---|---|---|---|
| 2,659,552 | 11/1953 | Stalker | 244/209 |
| 2,708,556 | 5/1955 | Smith et al. | 244/209 |
| 2,751,168 | 6/1956 | Stalker | 244/209 |
| 2,968,921 | 1/1961 | David | 244/265.33 |
| 3,478,987 | 11/1969 | Dorand | 244/212 |
| 4,515,101 | 5/1985 | Akerblom | 244/209 |
| 4,666,104 | 5/1987 | Kelber | 244/209 |

FOREIGN PATENT DOCUMENTS

| | | | |
|---|---|---|---|
| 696254 | 9/1940 | Germany | 244/208 |
| 626940 | 7/1949 | United Kingdom | 244/208 |

*Primary Examiner*—Galen L. Barefoot
*Attorney, Agent, or Firm*—Harris, Wallen MacDermott & Tinsley

[57] ABSTRACT

Apparatus and method for airflow vectoring control for an airfoil, a two dimensional jet, and the like. An airfoil or jet with a blunt open edge and a suction system for sucking air into the open edge. A blower system for blowing air out through the open edge. A control for changing the direction of flow through the open edge. A baffling arrangement for changing the magnitude and distribution of flow across the open edge.

26 Claims, 4 Drawing Sheets

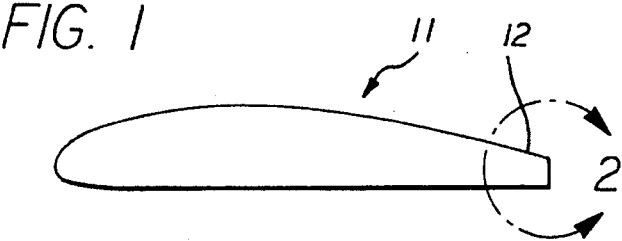
FIG. 1
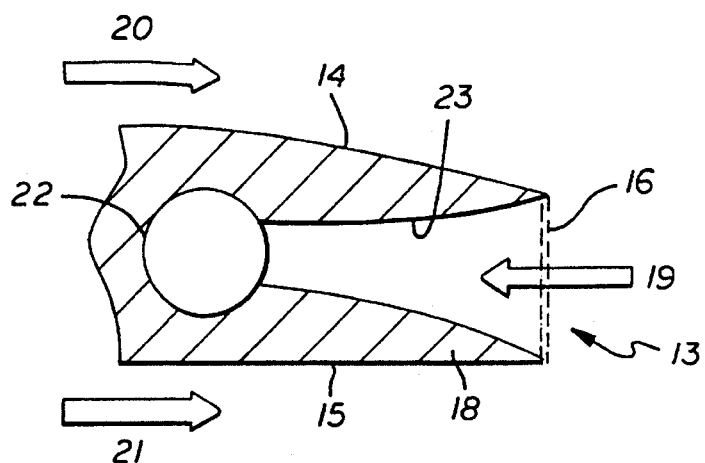
FIG. 2
FIG. 3
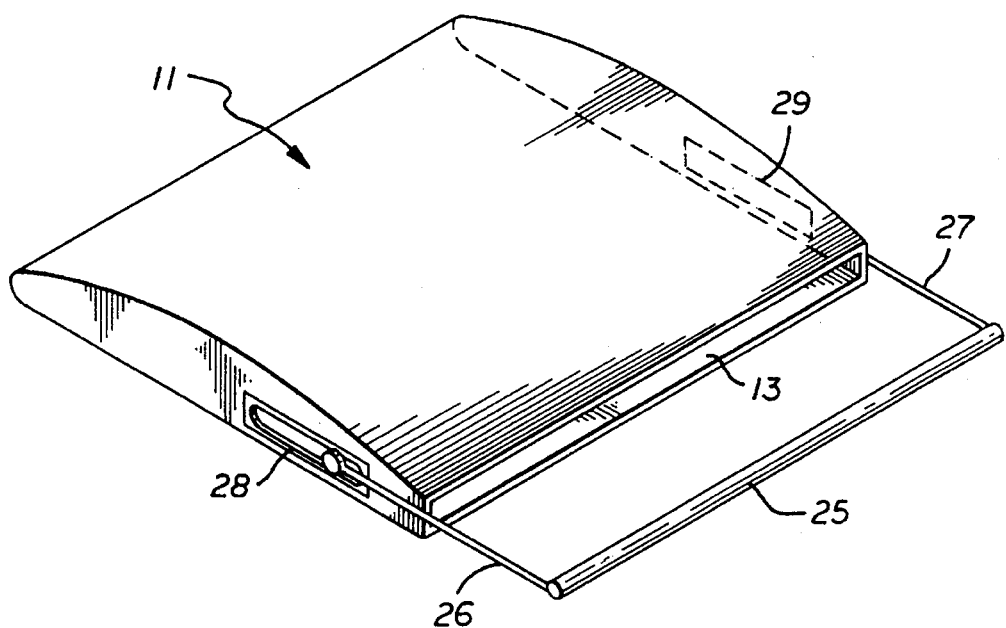

FLOW-VECTORED TRAILING-EDGE FOR AIRFOILS AND JETS

The United States Government has a paid up license in this invention and the right in limited circumstances to require the patent owner to license others on reasonable terms as provided for by the terms of contract no. F49620-92-J-0377 awarded by the United States Air Force.

BACKGROUND OF THE INVENTION

This invention relates to the control of airflow over airfoils, through jets, and the like. Such control of airflow is usually referred to as vectoring or directing of the airflow. The desirability of vectoring airflow for changing lift and control characteristics of an airfoil and thrust angle of a jet are well known. However, in the past, vectoring of airflow has been accomplished by maneuvering the nozzle or other structure through which the air is flowing, in the same manner that water flow through a hose is directed. The construction of such nozzles is expensive and adds weight to the structure, and the maneuvering of the nozzle is difficult and requires substantial drive forces when large airflows are involved.

Accordingly, it is an object of the present invention to provide new and improved method and apparatus for vectoring airflow which does not require a maneuverable nozzle. A further object is to provide such method and apparatus which is suitable for use with airfoils and with jets such as the two dimensional jets utilized in augmenting lift and control of aircraft. These and other objects, advantages, features and results will more fully appear in the course of the following description.

SUMMARY OF THE INVENTION

The invention provides for vectoring control of airflow around a chamber, which chamber has a blunt open edge with airflow toward the open edge both over and under the chamber, with suction provided for drawing air into the chamber through the open edge between the walls of the chamber. In the presently preferred embodiment, the chamber is an airfoil with a blunt open edge and with suction provided for drawing air into the open edge. In an alternative embodiment, the chamber is a two dimensional jet with upper and lower chambers or compartments, each with a blunt open edge and means for drawing air into the open edge.

The invention also includes control means for changing the direction of airflow into the open edge and for changing the distribution of airflow across the open edge. In one specific embodiment, provision is made both for drawing air into the open edge at one zone and blowing air out through the open edge of another zone. Additional blowing may be utilized through a port in a wall of the chamber.

BRIEF DESCRIPTION OF THE DRAWINGS

FIG. 1 is a side view of an airfoil;

FIG. 2 is an enlarged sectional view of the portion of the airfoil of FIG. 1 enclosed by the dotted circle;

FIG. 3 is a perspective view of an airfoil illustrating one form of control for flow vectoring;

DESCRIPTION OF THE PREFERRED EMBODIMENTS

Figure 4:
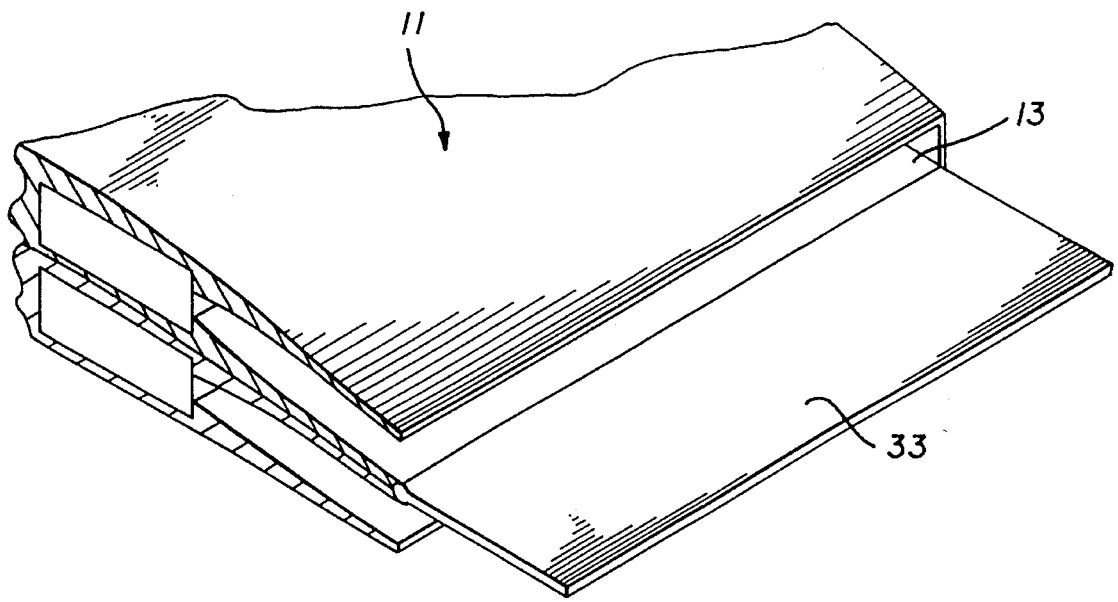
FIG. 4 is a view similar to that of FIG. 3 illustrating another form of control for flow vectoring.

The method and apparatus of the invention provide for producing flow vectoring or spatially localized redirection of an air stream which would have specific application to airfoil design or for thrust vectoring of a jet without pivoting the centerline of the jet. The type of flow redirection occurs, for example at the trailing edge of an airfoil or the exit lip of a jet. In each case, these edges would be specifically designed to be blunt-based so that a small near wake region is formed immediately behind them. The flow in the near wake formed by the streams flowing over each side of the blunt trailing edge is manipulated in order to change the orientation of the near wake relative to the free streams on either side of the wake. The manipulation can be accomplished by several means:

a. suction or suction and blowing at the base of the near wake;

b. suction or suction and blowing at the base of the near wake with a small rod or splitter plate inserted into the near wake to assist in the positioning of the saddle point formed by the streamlines of the time-averaged flow at the close of the near wake;

c. use of a rod or splitter plate mounted to the base region and pivoted at its mounting point and/or retractable so that its angle and spacing relative to the nominal near wake centerline can be controlled;

d. use of a splitter plate as explained in c. above together with suction on one side where the flow is to be deflected away from the adjacent free stream and either suction and blowing or just blowing on the other side where the flow is to be deflected toward the adjacent stream.

Flow vectoring or accentuated asymmetry in the mean flow streamlines of the near wake, occurs when the saddle point of the near wake is deflected toward the stream on one or the other side of the wake. The present invention provides practical means of accomplishing this type of stimulated asymmetry. Flow suction applied at the base near the separation point of the high speed side will cause the flow to turn away from the high speed side and move the near wake saddle point toward the low speed side. There exists a critical suction velocity or mass flux above which vortex shedding is suppressed. Suction velocities above this level will probably be most effective, but vectoring can be achievable at mass fluxes below this value as well, particularly, in combination with a splitter plate whose inclination and/or spacing can be controlled. In situations where drag is crucial, it may be advantageous to achieve this by suction and/or blowing alone without the insertion of a plate or rod downstream of the blunt trailing edge.

An airfoil 11 is shown in FIG. 1, with the trailing edge portion 12 in a dotted circle. The portion 12 is shown enlarged in FIG. 2. The trailing edge 13 formed by the upper wall or surface 14 and the lower wall or surface 15 is blunt rather than pointed, and is open. The blunt open trailing edge 13 usually is covered by a screen or grid 16 in order to keep foreign objects out of the interior of the airfoil.

The upper and lower surfaces 14, 15 form a chamber 18 within the airfoil, and means is provided for producing a suction within the chamber for drawing air into the chamber through the open edge. This airflow into the open edge is indicated by the arrow 19. The inward or forward airflow 19 is counter to the normal airflow around the airfoil, as shown by the arrows 20, 21.

The airflow into the open edge is produced by a vacuum pump 22 positioned within the airfoil and connected to the open edge by a conduit 23. The exhaust from the vacuum pump may be directed to an engine bypass or to a blown flap or blown at the wing tip or otherwise as desired.

Suction at the open edge provides a lift augmentation technique or a high lift device for airfoils. The traditional trailing edge flap is replaced by aerodynamic flow vectoring of the flow behind a divergent or blunt trailing edge of the airfoil. Flow vectoring is a term which means a controlled directing the flow. Aerodynamic flow vectoring is a means of redirecting the flow near the trailing edge without mechanically redirecting the flow by movement of boundaries or walls or nozzles guiding the flow, and is suitable for controlling lift of the aircraft and maneuvering the aircraft. It can be used with lifting surfaces and with control surfaces.

The separated flow in the near wake behind a blunt trailing edge airfoil is vectored for lift control or lift augmentation by means of selective, disturbed suction from the blunt trailing edge. Blowing may also be used. Suction is used to suppress vortex shedding by reducing sufficiently the region of absolute instability in the near wake below that needed to sustain a global instability of the wake. Once vortex shedding is suppressed, the asymmetric wake flow can be vectored in either direction, either toward the high speed side or toward the low speed side, by selectively distributing the suction across the base of the airfoil. The key points are: a blunt trailing edge used to create a wake behind the airfoil and from which suction can be applied; the inevitable vortex shedding that occurs in a wake when the wake Reynolds Number is above a critical value must be suppressed if the near wake flow is to be effectively vectored; the vortex shedding can be suppressed by suction which diminishes the region of absolute instability in the near wake; and the asymmetry or velocity shear across the wake when the airfoil is in a lifting position can be exploited to stimulate flow vectoring of the near wake by selectively distributing the required mass depletion or suction across the base of the airfoil. A critical suction velocity exists which depends on such parameters as the Reynolds number for the wake and the velocity ratio across the wake.

A major advantage of this technique for high lift control for airfoils is that it does not require mechanical movement of the airfoil surface as in the nominal method of hinged flaps. The redirection of the flow and associated changes in lift on the airfoil is accomplished by aerodynamically vectoring the flow. Another advantage is that the suction applied at the blunt trailing edge can reduce the onset of trailing edge separation by alleviating the adverse pressure gradient effect on the boundary layer approaching the trailing edge.

An alternative embodiment is illustrated in FIG. 3, with a control rod 25 positioned beyond the open edge or suction port 13. The control rod is carried on support rods 26, 27 which are mounted within the airfoil and driven by motors 28, 29. These motors provide for extending and retracting the control rod and also for rotating the support rods 26, 27 to raise and lower the control rod relative to the open edge.

The control rod can be positioned at a desired location for the near wake stagnation point. In this way the angle of re-direction of the vectored flow may be extended and stabilized at the desired result.

Figure 5:
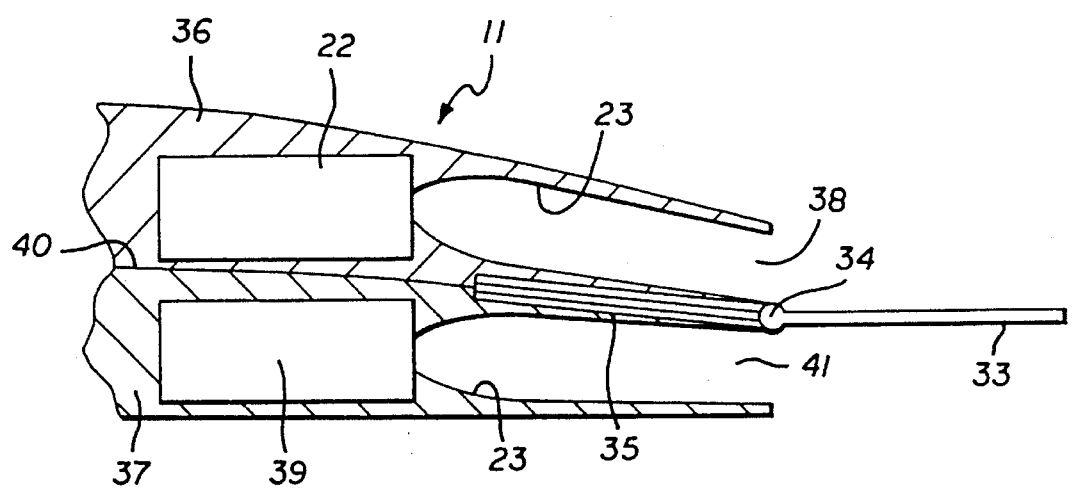
FIG. 5 is a sectional view of the airfoil of FIG. 4.

Another alternative of the embodiment is illustrated in FIGS. 4 and 5, with a plate 33 positioned at the open edge 13. One or more drive motors 34 provide for changing the angle of the plate 33 with respect to the airfoil 11 and also for retracting and extending the plate 33 along the track 35. In one embodiment, the interior of the airfoil is divided into upper and lower compartments 36, 37 by a divider sheet 40. The vacuum pump 22 and a conduit 23 are connected to the upper portion of the open edge 13 providing a suction port 38. A blower pump 39 and another conduit 23 are connected to the lower portion of the open edge providing a blowing port 41. The use of both suction and blowing provides increased vectoring control.

Figure 6:
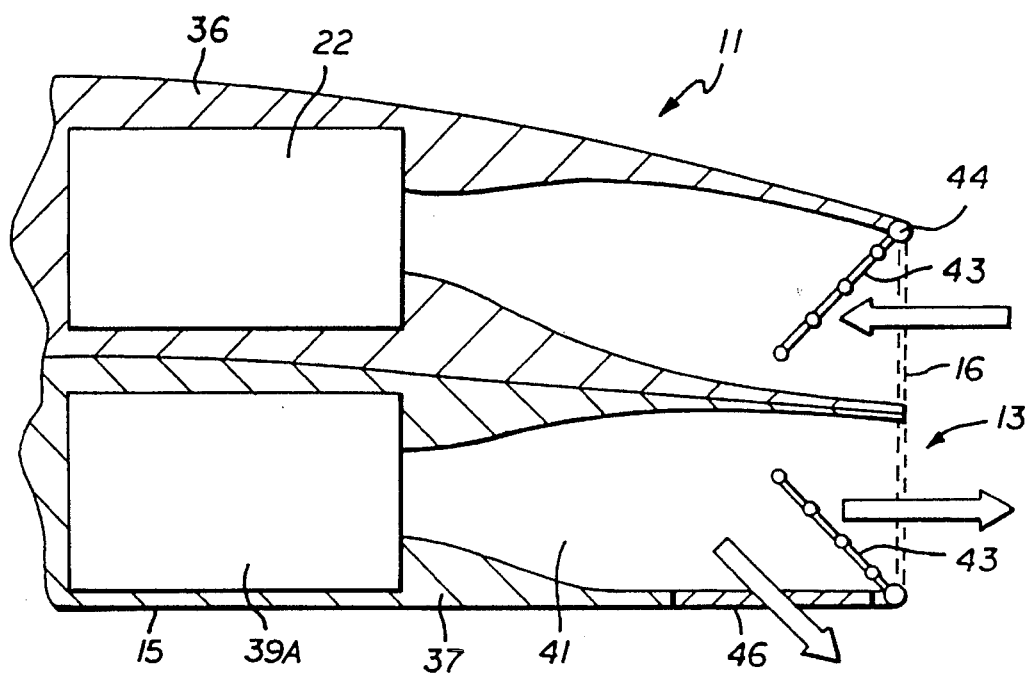
FIG. 6 is a view similar to that of FIG. 5 illustrating another alternative embodiment of the invention.

Means may also be incorporated for varying the distribution of airflow across the open edge. The embodiment illustrated in FIG. 6 includes a baffle 43 positioned at the open edge, with a drive motor 44 which moves the baffle into position across the open edge and out of position away from the open edge.

Figure 7:
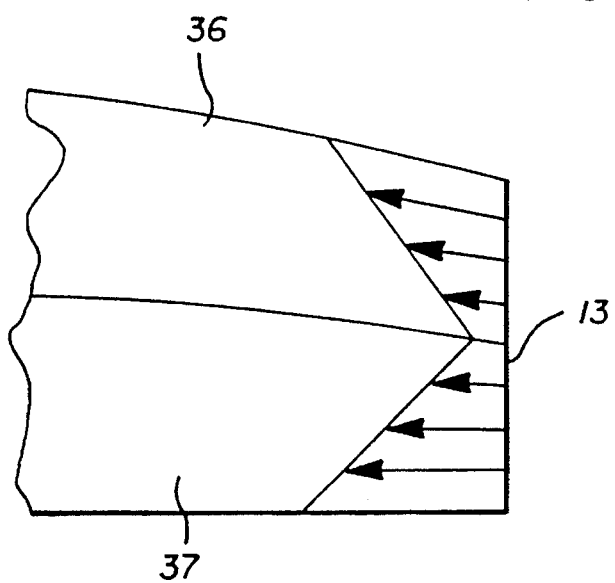
FIG. 7 is a diagram illustrating air velocity accomplished with the baffles of the embodiment of FIG. 6.

The porosity of the baffle may be varied across the baffle from the hinged side to the opposite side, to change the distribution of airflow through the open edge. The variation in airflow across the open edge is illustrated in the diagram of FIG. 7. Further, in the embodiment of FIG. 6, a combination vacuum and blower pump 39A may be utilized to provide either suction or blowing at the lower port 41, and another moveable baffle 43 may be installed at the lower port. Also, a sliding port 46 may be positioned in the airfoil wall 15 to provide another blowing port.

Figure 8:
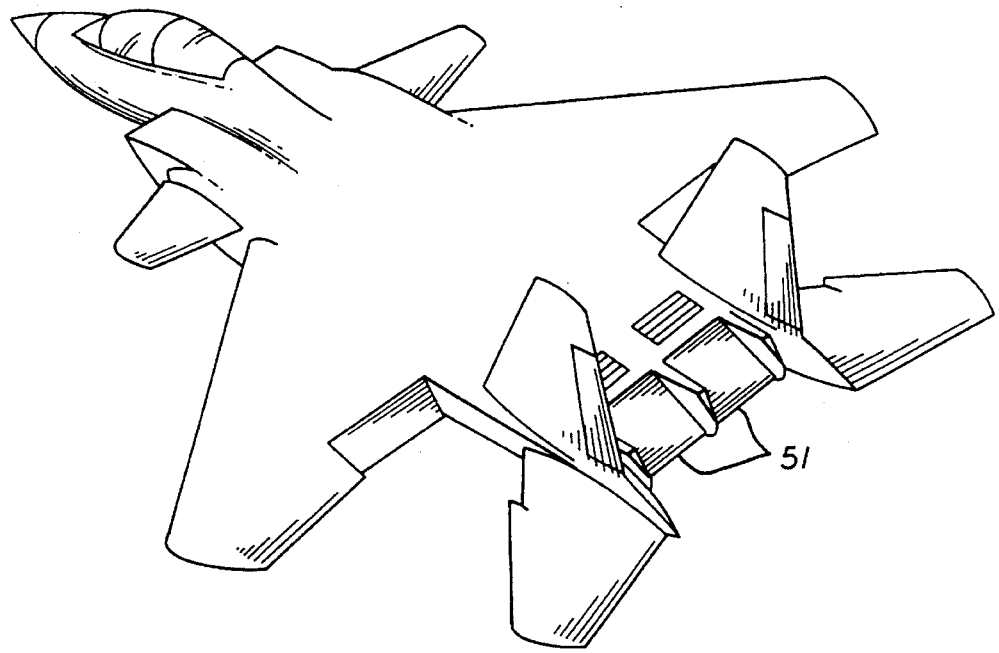
FIG. 8 is a perspective view illustrating a jet aircraft with two dimensional jets at the rear.
Figure 9:
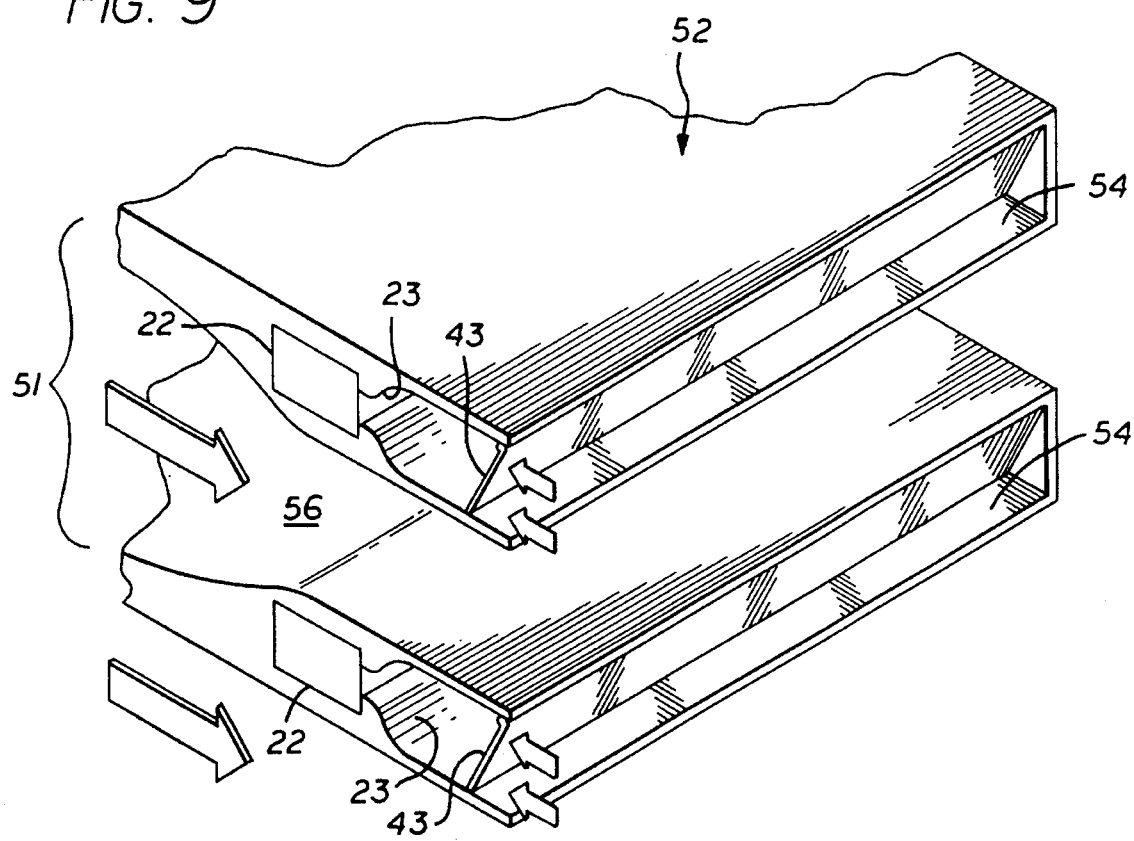
FIG. 9 is an enlarged partial view of a two dimensional jet incorporating the invention.

An alternative embodiment of the invention as applied to a two dimensional jet is illustrated in FIGS. 8 and 9. A typical jet aircraft shown in FIG. 8 may be equipped with two dimensional jets at the aft end of the fuselage. Typically nozzles are incorporated within the structure to provide thrust vectoring for improved maneuvering of the aircraft. The flow vectoring of the present invention may be substituted for the nozzles to achieve the same thrust vectoring.

A two dimensional jet 51 has an upper compartment 52 and a lower compartment 53 with each compartment having a blunt open edge 54. A separate vacuum pump 22 and conduit 23 is connected to the open edge in each of the compartments. The two compartments define a space 56 therebetween for the jet source of the aircraft. By varying the magnitude of the suction to the respective open edges and by varying the distribution of the suction across the open edges in the manner described above, the jet source exiting the space 56 may be vectored upward and downward to achieve the desired maneuverability without the need for moveable nozzles. Normally the airflows at both open edges are vectored in the same direction at the same time, but they can be vectored in opposing directions at the same time to improve jet and air stream mixing if desired. The various embodiments for the suction and blowing illustrated and described for the airfoil are equally applicable to the compartments of the two dimensional jet.

The airflow vectoring method and apparatus of the invention are suitable for use in various other configurations where vectoring of airflow is desired, such as in automobile race cars, large trucks, combustion chambers, streamline control, and the like. While the word "air" has been utilized in the specification and claims, it is to be understood that the invention is equally applicable to other gases and to fluids, and "air" is intended to encompass any gas or fluid.

The magnitude of suction and/or blowing may be varied by varying the operation of the suction and blower pumps. The pumps may be turned on and off and the speed of pumping can be changed, periodically and as desired, and where more than one pump is used, they can be operated together or separately and can be operated in parallel and in opposition, as desired.

I claim:

1. An airfoil having a blunt open edge,
   divider means positioned within said airfoil and extending from said open edge for dividing the interior of said airfoil into separate upper and lower compartments,
   suction means positioned for drawing air into said upper compartment, and blower means for exhausting air from said lower compartment.

2. An airfoil as defined in claim 1, including a screen over said open edge.

3. An airfoil as defined in claim 1 including control means for changing the direction of flow into said open edge.

4. An airfoil as defined in claim 3 wherein said control means includes a rod, and support means for supporting said rod downstream of said open edge.

5. An airfoil as defined in claim 3 wherein said control means includes a plate, and support means for supporting said plate downstream of said open edge.

6. An airfoil as defined in claim 5 wherein said support means includes motor means for changing the position of said plate relative to said open edge.

7. An airfoil as defined in claim 1 including distribution means for distributing the airflow at the open edge of each of said compartments.

8. An airfoil as defined in claim 1 including distribution means for distributing the airflow at said open edge.

9. An airfoil having a blunt open edge and suction means for drawing air into said open edge, a screen over said open edge, a vacuum pump within said airfoil, passage means defining a flow path between said open edge and said vacuum pump,
   control means for changing the direction of flow into said open edge, said control means including a rod, and support means for supporting said rod downstream of said open edge,
   said support means including motor means for changing the position of said rod relative to said open edge.

10. An airfoil having a blunt open edge and suction means for drawing air into said open edge,
    divider means positioned within said airfoil and extending from said open edge for dividing the interior of said airfoil into upper and lower compartments,
    with said suction means positioned for drawing air into one of said compartments, and including
    blower means for exhausting air from the other of said compartments, a plate and support means for supporting said plate downstream of said open edge, said support means including motor means for changing the position of said plate relative to said open edge,
    distribution means for distributing the airflow at the open edge of each of said compartments, said distribution means including baffle means positionable at least one of said open edges, said baffle means having opposite sides with the porosity of said baffle means varying from one side to the other, and means for positioning said baffle means at said open edge.

11. An airfoil as defined in claim 10 wherein said distribution means includes means defining a sliding port at the surface of said airfoil adjacent said open edge.

12. An airfoil having a blunt open edge and suction means for drawing air into said open edge, and distribution means for distributing the airflow at said open edge,
    said distribution means includes baffle means positionable at said open edge, said baffle means having opposite sides with the porosity of said baffle means varying from one side to the the other, and including means for positioning said baffle means at said open edge.

13. A two dimensional jet having a rectangular opening defined by separate upper and lower compartments with a jet thrust source exiting between said compartments, each of said compartments having a blunt open trailing edge, and suction means for drawing air into said open edge of said upper compartment vectoring the jet downstream of said blunt open edge.

14. A jet as defined in claim 13 including distribution means for distributing the airflow at said open edge of said upper compartment.

15. A jet as defined in claim 13 including first suction means for drawing air into said open edge of said upper compartment, and second suction means for drawing air into said open edge of said lower compartment.

16. A jet as defined in claim 13 including distribution means for distributing the airflow at said open edge of each of said compartments.

17. A two dimensional jet having a rectangular opening defined by upper and lower compartments, each of said compartments having a blunt open edge, suction means for drawing air into said open edge of at least one of said compartments, and
    distribution means for distributing the airflow at said open edge of said one compartment, said distribution means including baffle means positionable at said open edge of said one compartment, said baffle means having opposite sides with the porosity of said baffle means varying from one side to the other, and means for positioning said baffle means at said open edge.

18. A two dimensional jet having a rectangular opening defined by upper and lower compartments, each of said compartments having a blunt open edge, and suction means for drawing air into said open edge of at least one of said compartments,
    distribution means for distributing the airflow at said open edge of each of said compartments, said distribution means including baffle means positionable at said open edge of each of said compartments, with each of said baffle means having opposite sides with the porosity of said baffle means varying from one side to the other, and means for selectively positioning each of said baffle means at the corresponding open edge.

19. An airflow vectoring control including means defining a chamber having a blunt open edge between upper and lower walls with airflow toward said open edge over said upper wall and under said lower wall, suction means for drawing air into said chamber between said walls, and distribution means for distributing the airflow at said open edge,
    said distribution means including baffle means positionable at said open edge, with said baffle means having opposite sides with the porosity of said baffle means varying from one side to the other, and means for selectively positioning said baffle means at said open edge.

20. A method of vectoring airflow from an airfoil having a blunt open edge and a divider positioned within the airfoil extending from the open edge dividing the interior of the airfoil into separate upper and lower compartments, including the steps of drawing air into the upper compartment through the open edge, and exhausting air from the lower compartment through the open edge.

21. A method as defined in claim 20 including changing the direction of flow into the open edge.

22. A method as defined in claim 21 including positioning a rod downstream of the open edge.

23. A method as defined in claim 21 positioning a plate downstream of the open edge.

24. A method as defined in claim 23 including changing the position of said plate relative to said open edge to change the vectoring angle.

25. A method as defined in claim 20 including distributing the airflow across the open edge.

26. A method of vectoring airflow from an airfoil having a blunt open edge, including the steps of:

drawing air into the open edge, changing the direction of flow into the open edge, positioning a rod downstream on the open edge, and changing the position of the rod relative to the open edge to change the vectoring angle.

* * * * *